Aug. 7, 1945.　　　　E. M. SPLAINE　　　　2,381,011
OPHTHALMIC MOUNTING
Filed Feb. 7, 1941　　　　2 Sheets-Sheet 1
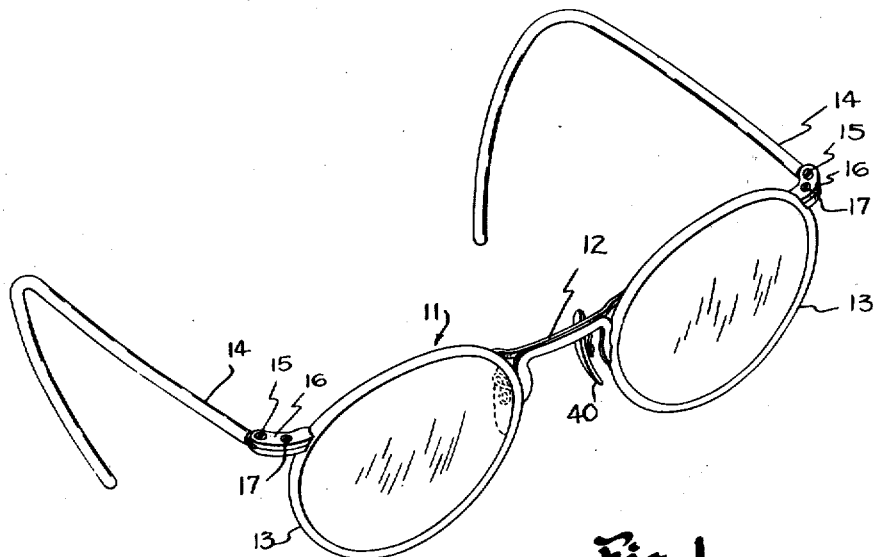
Fig. 1
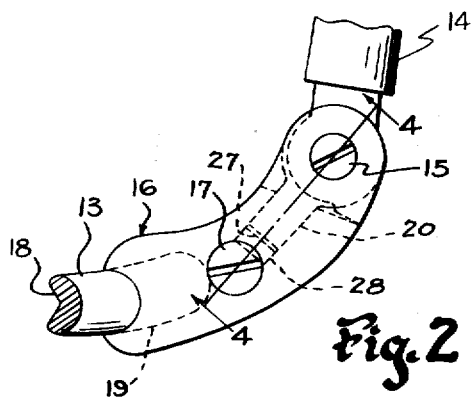
Fig. 2
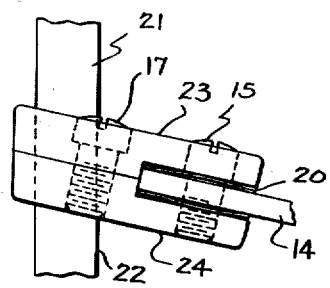
Fig. 3
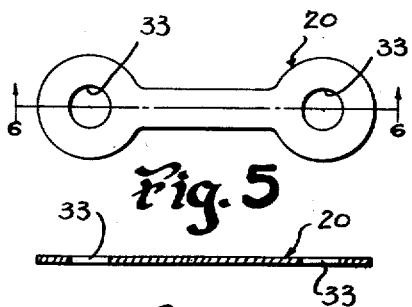
Fig. 5
Fig. 6
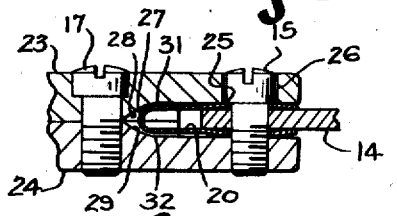
Fig. 4
INVENTOR.
EDWARD M. SPLAINE
BY
*Louis L. Gagnon*
ATTORNEY.

Aug. 7, 1945.  E. M. SPLAINE  2,381,011
OPHTHALMIC MOUNTING
Filed Feb. 7, 1941  2 Sheets-Sheet 2

INVENTOR.
EDWARD M. SPLAINE
BY Louis L. Gagnon
ATTORNEY.

Patented Aug. 7, 1945

2,381,011

UNITED STATES PATENT OFFICE 2,381,011

OPHTHALMIC MOUNTING

Edward M. Splaine, Southbridge, Mass., assignor to American Optical Company, Southbridge, Mass., a voluntary association of Massachusetts Application February 7, 1941, Serial No. 377,861

10 Claims. (Cl. 88—53)

This invention pertains to an improvement in ophthalmic mountings and more particularly to a means of obtaining a more desirable frictional pivot or hinge by which the temple member is connected to the endpiece.

An object of the present invention is to provide a means for pivotally connecting the temple member to the temple support wherein the friction therebetween will have a greater equalization of distribution to provide a more uniform bearing between the temple member and the temple support.

A further object is the provision of a resilient frictional means to restrict rotational movement of the temple of an ophthalmic mounting, the pressures for increasing the rotational resistance being applied substantially vertically and laterally to the temple adjustment screw.

A further object is to provide a pivotal connection between the temple member and the temple support having a frictional resilient means between said members which means may be positively engaged to one portion of the temple support when used in a split lens-rim type of mounting.

A further object is to provide a frictional member for the pivotal connection between the temple member and the temple support wherein the frictional member has means thereon to prevent rotation thereof provided by engagement stop means completely embraced within the temple support member and hidden from view.

A further object is to provide a temple frictional pivot means having positive longitudinal and vertical locking means for the pivot screw or pin member.

A still further object is to provide a resilient means for frictionally connecting the temple with its supporting mounting, which frictional resilient means may be manufactured from a single piece of strip material having protuberant eye or cup means for engaging opposing inner surfaces of a split lens-rim temple support and outer surfaces of the temple housed within its supporting mounting.

A still further object is to provide a substantially U-shaped resilient member formed of a single piece of metal which is disposed within a housing, restricting rotational and longitudinal movement of the resilient member to provide variable increased resistance from two points substantially in the same plane by manipulation of a single adjustment means.

Another object is to provide a variable resilient U-shaped member for the purpose of increasing resistance of the temple pivot with its supporting member by having the temple pivot adjustment means urging the U-shaped member against longitudinal restricting means, which U-shaped member is longitudinally movable by vertical manipulation of the temple pivot means.

Other objects and advantages will become apparent from the following description taken in conjunction with the accompanying drawings, and it will be apparent that many changes will be made in the details of construction and arrangement of parts without departing from the spirit of the invention as expressed in the accompanying claims. The exact details shown and described are preferred forms, only shown by way of illustration and are not to be considered as limitations.

Referring to the drawings:

Fig. 1 is a perspective view of an ophthalmic mounting showing split lens-rim temple supports pivotally connected to the temples.

Fig. 2 is an enlarged fragmentary view showing the temple support connected intermediate the lens-rim and the temple with the resilient frictional means for the temple and temple support shown dotted.

Fig. 3 is an enlarged fragmentary side view of the mounting portion substantially as shown in Fig. 2.

Fig. 4 is a sectional view taken along line 4—4 of Fig. 2 indicating the relation of the resilient frictional means with the temple support, temple member, and pivotal means for securing the temple to the temple support.

Fig. 5 is a plan view of the resilient frictional means punched from a single piece of material with perforations therein minus the protuberant portions about the perforations.

Fig. 6 is a sectional view taken along line 6—6 of Fig. 5 showing the flat metallic strip before it is formed for ultimate insertion within the temple support.

Figure 7:
Fig. 7 is a sectional view of the metallic strip shown in Fig. 6 after the cylindrical protuberant portions have been formed thereon and the strip is properly shaped prior to the ultimate U-forming operation.

Heretofore, ophthalmic mountings requiring a temple support frequently had a resilient means for restricting the rotational movement of the temple within the temple support. The resilient frictional means were frequently permanently affixed within or on the temple support mounting which required soldering or some other means for accomplishing a secure connection between the frictional means and the temple support. In some instances, loosely mounted frictional supports employed a simple spring in a convenient manner to position it about the pivotal means of the temple where it engaged the temple support.

The frictional resilient means used heretofore has had certain functions which may have accomplished certain results but was insufficient for several reasons, namely, difficult to remove and replace, lack of proper frictional means due to the particular contour of the frictional member and because the longitudinal restricting means usually are so constructed as to prevent adequate longitudinal movement of the frictional member, thereby limiting the desirable temple rotation about its pivot on the temple support.

The present invention contemplates a U-shaped metallic strap having protuberant cups formed thereon to engage the inner surfaces of the temple support and the outer surfaces of the temple within said support, said strap having longitudinal restrictive means that permit slight longitudinal engagement of the strap with the support so that the radius from the center of the temple support to the end of the U-shaped member is variable and may be increased by compressing the protuberant cupped ends of the U-shaped member on the temple support, the longitudinal radius dimension being increasable to give an added amount of friction to the temple pivoting means not only by depressing the protuberant formations on the U-shaped strap but also by tending to restrict the longitudinal movement of said strap by an inclined plane function due to the engagement of the closed end of the U-shaped member with a wedge surface within the support.

Referring to the drawings and particularly to Fig. 1, an ophthalmic mounting 11 is shown having a bridge 12 connected intermediate lens-rims or eye wires 13 with nose pads 40 suitably connected to the central portion of the ophthalmic mounting. Temples 14 are pivotally connected by screws 15 to a temple support 16 which temple support is connected to the lens-rim 13. The present showing indicates that a split lens-rim is used with the temple support drawing the split portions of the lens-rims together by means of screws 17. The illustrative showing indicates use of split lens-rims, but it is to be understood that a unitary lens-rim may be employed since the invention resides primarily in the temple support frictional means for restricting rotation of the temple per se.

The enlarged fragmentary view as shown in Fig. 2 has the temple support 16 connecting lens-rim 13 with the temple 14. It should be noted that the lens-rim 13 has a V-shaped groove 18 therein which is adapted to receive the V-shaped peripheral edge of the lens. The lower portion of the lens-rim is shown dotted at 19 and in the present instance is connected to the temple support 16 at the lower portion thereof. The screws 17 are the screws which connect the upper and lower portion of the temple supports together while the screws 15 are the temple pivot members which connect the temple with the temple support. The U-shaped resilient member 20 is shown dotted and extends almost to the body of the screws 17.

Fig. 3 shows the upper and lower portions 21 and 22 respectively of the split lens-rim with the upper and lower portions 23 and 24 respectively of the temple support. The screw 17 is shown connecting the temple support portions 23 and 24 securely together while the temple rotational adjusting screw 15 is shown loosely fitted in the upper portion 23 of the temple support but threadedly connected to the lower section of the portion 24 of said temple support. The U-shaped resilient means is shown with its free ends embracing the end of the temple while the resilient member 20 is confined with its outer protuberant surfaces adjacent the inner surfaces of the slot within the temple support.

Figs. 5 and 6 show a plan and sectional view respectively of the resilient metallic strip 20 prior to its being bent in a U-shape and being formed with protuberant eyes substantially at the extremities of the strip. The maximum diameters of the end portions are substantially identical and will fit within the confines of the temple support to afford a neat appearing article.

Fig. 4 is a sectional view taken along line 4—4 of Fig. 2 to show the relation of parts within the temple supporting member for effecting operation and proper manipulation of the temple frictional adjustment means. The screw 17 is substantially as described for Fig. 3, namely, that its function is to draw the upper and lower parts 23 and 24 together. The butt end of the temple 14 is shown between the upper and lower portions 23 and 24 respectively of the temple support. The temple adjustment screw 15 is shown threadedly connected to the lower portion 24 of the temple support while the shoulder 25 which constitutes the underneath portion of the head of the screw 15, engages the protuberant eye or cylindrically formed portion of one end of the U-shaped member.

It is to be particularly noticed that there is no shoulder within the temple support portion 23 which engages the underneath shoulder 25 of the screw 15. In this regard the temple and its frictional means are both connected to the lower portion 24 of the temple support 16. A guiding orifice 26 is provided in the upper portion 23 of the temple support. This orifice 26 permits manipulation of the screw 15 without separating the portions 23 and 24 of the temple support and the size of the hole 26 is sufficiently large to permit a working fit of the head of the screw 15 within the hole 26. The closed portion 27 of the U- shaped member is within the upper and lower channels 28 and 29 of the upper and lower portions 23 and 24 respectively of the temple support. It is particularly pointed out that the portion 27 fits into the channels 28 and 29 very neatly after the screw 17 has drawn together portions 23 and 24 to their optimum closed position. In this respect, the channels 28 and 29 at no time frictionally bind the protuberant end 27 of the resilient U-shaped member, the opposing channels being formed merely to act as a single receptacle for receiving the protuberant end of the U-shaped member. The side-walls 31 and 32 which are the side-walls of the upper and lower channel portions respectively engage the U-shaped member to restrict the rotational movement thereof.

Referring back to Fig. 2, it will be seen that the channel 28 has nicely received the longitudinal extension of the U-shaped resilient member.

The view shown in Fig. 4 indicates that the closed portion of the U-shaped member is substantially contiguous with the knee of the curve in the channels 28 and 29. This particular construction shown in Fig. 4 is intended to represent a condition when the screw 15 has properly been adjusted to afford the desired friction on the temple to restrict rotational movement thereof. A sufficient pressure on cylindrical portions of the protuberant eye ends will cause the protuberant eye ends to be depressed thereby giving a greater radius to the cylindrical formation on the eye ends. Naturally, the increased radius will cause the U-shaped member to be extended longitudinally with the free end of the U-shaped member moving to the right of the temple while the closed end of the U-shaped member will move longitudinally to the left of the temple butt as shown in Fig. 4. It is to be understood in this showing that the channel portions 28 and 29 form a recess sufficiently large to permit this longitudinal extension of the U-shaped member so that no counter-force is exerted on the shoulder 25 of the screw 15.

It is particularly important in this view that this be pointed out since other views take advantage of this longitudinal expansion to create a counter-pressure on the butt or closed end of the U-shaped member so that an increased pressure is brought to bear on the underneath shoulder 25 of the screw 15 and also on the portion of the screw intermediate the bottom of the temple butt end and the adjacent surface of the lower portion 24.

The distinction between the two types is that one of the U-shaped members utilizes the side walls primarily to restrict rotational movement of the protuberant portion of the U-shaped member while the other type not only uses the side-walls for restricting rotational movements of the end portion of the U-shaped member but also utilizes the longitudinal expansion of the U-shaped member which engages the knee of the curve in the channel walls to create a back pressure which will be more fully described in detail in relation with the other views.

The resilient member 20 shown in Fig. 7 has perforations 33 therein which perforations are somewhat larger in diameter than the outside diameter of the pivotal screw 15 which is insertable therethrough. The closed portion of the U-shaped member is shown as 27 which will be the base of the U after the bending operation of the U-shaped member is completed. The completed U-shaped member is shown in Fig. 8 with like characters representing like parts and it will be noted that the protuberant or distended portion 34 has a cylindrical conformation so that pressure on the highest point of the cylindrical portion 34 will permit the resilient member 20 to be more effective for certain types of temple pivotal adjustments.

Figure 8:
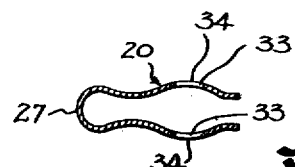
Fig. 8 is a longitudinal sectional view of a metallic strip shown in Fig. 7 after the U-shaping operation is completed.
Figure 9:
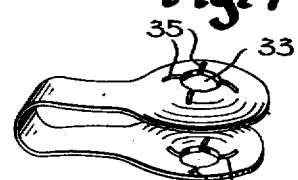
Fig. 9 is a modified perspective view of the U-shaped member having cupped or distended portions with splits therein to give a desired function of resiliency.

The U-shaped member shown in Fig. 9 is somewhat similar to that shown in Fig. 8 with the exception that the distended portion about the orifice 33 is positively cupped so that the distention is completely uniform about the orifice 33. Slots 35 are cut radially in the cupped portion to act as a plurality of spring leaves where increased resiliency is desired in this type of U-shaped member. Any slit or cup, or even an indentation of the point or elongated type may be used. The purpose of the split is to provide not only a plurality of resilient leaves on the cupped portion of the U-shaped member but also to provide an irregular surface that will grip the underneath side of the screw head so that the head shoulder 25 may engage the irregular surface to retain the peripheral screw 15 in the predetermined position after it has been adjusted.

Figure 10:
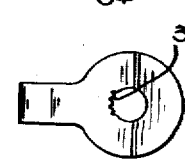
Fig. 10 is a top view of a U-shaped member substantially similar to that shown in Fig. 8 with the inclusion of toothed members for positively locking the temple pivotal screw.
Figure 11:
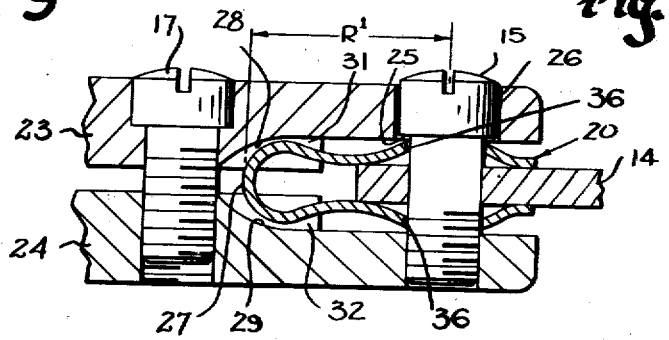
Fig. 11 is an enlarged sectional view somewhat similar to that shown in Fig. 4, having a U-shaped member with a radius greater than the radius of the knee of the curve formed by the channel members, said view showing opposing sides of the temple support before being drawn together.

The resilient member shown in Fig. 10 is substantially similar to that shown in the cross sectional view of Fig. 8. Of particular note in this view is the toothed or pronged section which has prongs 36 shown extending partially about the orifices in the U-shaped member. The purpose of the prongs 36 which are located on the upper and lower sides of the U-shaped member, is to engage the screw 15 above and below the temple butt so that a full closure of the upper and lower parts of the temple support will clamp the closed end of the U-shaped member between the knees of the curves in the channels 28 and 29 causing the vertical radius of the closed portion to be decreased and the longitudinal radius of the branches of the U-shaped member 20 to be increased. Before the closing operation of the temple support, the radius from substantially the center of the screw 15 to the extreme closed portion of the U-shaped member will be substantially as indicated by the dimension R1.

Figure 12:
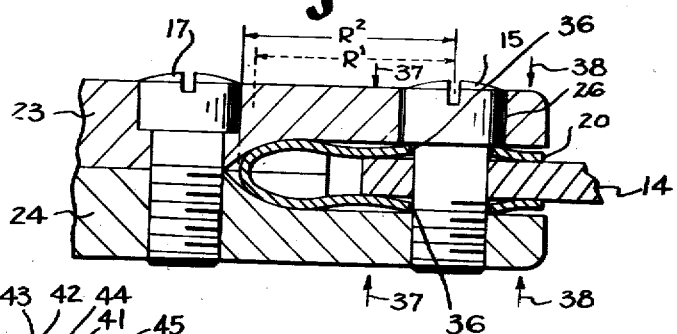
Fig. 12 is a view somewhat similar to Fig. 11, wherein the U-shaped member is longitudinally distended due to compression of the opposing sides of the temple support in combination with the temple pivot adjusting screw.

Referring to Fig. 12 it will be noted that the parts 23 and 24 of the temple support are in complete engagement with each other due to the tightening of screw 17. This result has caused the vertical radius of the closed portion 27 of the U-shaped member to be decreased, while the longitudinal radius from the center of screw 15 to the longitudinal extremity of the U-shaped member has been increased to the dimension indicated as R2. The knees of the curved portions of the channels 28 and 29 are now shown as having decreased the vertical radius of the closed portion of the U-shaped member and caused the portion 27 to be distorted due to the action of the portion 27 against the inclined end portions of the channels 28 and 29. This drawing together of the temple support portions 23 and 24 has caused an inclined plane action to take place urging the pronged members 36 against the screw 15.

The urging of the prong members 36 against the screw 15 is caused by a counter-pressure resulting from the inclined plane action of the U-shaped portion 27 engaging the curved portion of the channels 28 and 29.

The counter-pressure causes a bearing of the U-shaped member against the temple butt in a vertical plane substantially as indicated by arrows 37. The elongation of the U-shaped member also causes a bearing to be placed on the temple butt approximately as indicated by arrows 38.

The component pressures in the planes 37 and 38 are brought about by the increase in longitudinal dimension of the U-shaped member prior to any adjustment by the screw 15. The shoulder 25 of the screw 15 will prevent the U-shaped member from expanding upwardly due to the clamping action of the temple support portions 23, 24.

While the pivotal or adjusting screw 15 may be rotated after the temple lugs 23 and 24 are completely closed by action of the screw 17, it is to be understood that the preferable arrangement is to properly adjust the screw 15 in relation to the lower temple lug 24 before completely closing together lugs 23 and 24. To attain this result the material of the screw 15 and the temple 14 is preferably softer than the material of which the U-shaped member 20 is made. By this arrangement the screw 15 may be properly adjusted prior to closing the lugs 23 and 24 in their ultimate position. The drawing together of the lugs 23 and 24 by the screw 17 will thereafter decrease the radius of the closed end of the U-shaped member by engagement with the upper and lower walls of the channel member, thereby causing the longitudinal dimension of the U-shaped member 20 to be increased whereby the prongs 36 will be forced into the screw 15 adjacent or contiguous with the shoulder 25 of the screw 15. This biting into the metal by the prongs 36 due to the longitudinal pressure will positively hold the screw against any normal manipulation of the temple.

The temple butt is preferably made of softer material than the resilient U-shaped member 20 so that after a period of use a smoothing out of the engaging surface between the U-shaped member and the temple butt will occur, so that an increased intimate contact area between the resilient member and the adjacent temple engaging surfaces will become apparent and will provide greater and better frictional surfaces between the resilient member 20 and the temple 14.

The materials used and the working plus and/or minus tolerances will definitely have a bearing on the results obtained, that is, the screw 15 may be adjustable after the lug portions 23 and 24 are drawn together while still retaining the gripping function of the prongs 36 against the screw 15, or the screw 15 may be so gripped by the prongs 36 due to the lateral force exerted by the closing of the lugs 23 and 24 that the screw will be positively locked against rotation. As pointed out hereinbefore, the former arrangement may be desirable but the latter arrangement is preferable.

The pronged portions 36 exert a longitudinal pressure which restricts rotational movement of the screw 15 since the prongs will be urged into the metal of the screw 15 to create a pressure thereon. A locking action is also brought about by the slotted portions 35 of the cupped formation. While it has not been felt necessary to show a view with slots in the cylindrical conformation, it should be clear to one skilled in the art that this may be done in much the same manner as the cutting of the slots in the cupped portion. The purpose is the same, that is, to restrict rotational movement of the screw due to a gripping of the shoulder 25 by the irregular surface of the slot. The purpose of the slots in the cupped formation is not only to create an irregular surface for locking but also to give added resiliency to the spring-like portions when the cupped formations are under tension due to longitudinal counter-pressure as well as due to vertical pressure by a downward manipulation of the screw 15.

Close tolerances will of necessity be required in dimensioning the radius of the knee of the curve in the channel portions 28 and 29 and also regarding the dimensions of the interengaging U-shaped member. These tolerances will be such that proper dimensioning of the parts will give the desired results so that the longitudinal counter-pressure or counter-force will be definitely obtainable for locking action to prevent rotational movement of the screw 15.

It will be noted that the interengagement of the male portion of the screw 15 with its complemental female portion will positively hold the U-shaped member and the temple in adjusted position with the portion 24 of the temple support when it becomes necessary to separate the portions 23 and 24 of the temple support for any reason whatsoever.

Figure 13:
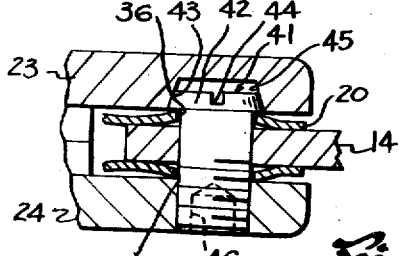
Fig. 13 is a modification of the means for restricting longitudinal movement of the temple pivotal connection by utilization of two positive locking means on the temple screw per se.

The modification shown in Fig. 13 has temple lugs 23 and 24 shown partly broken away and these lugs are substantially similar to the temple lugs described throughout the specification with the exception that the temple adjusting screw 41 has a head 42 thereon with the inclined side-walls 43, so that the head of the screw is shaped substantially like the frustum of a cone, that is with inclined sides, with the top of the cone cut off. The screw 41 has a screw driver slot 44 therein to permit rotational adjustment of the screw 41 for tensioning the resilient means of the temple frictional mechanism. The upper lug 23 has an orifice with inclined side-walls 45 which side-walls have a substantially identical inclination as the side-walls of the screw head, so that when the parts 23 and 24 are drawn together by the connecting screw such as 17 in Fig. 12 the side-walls 43 of the screw head 42 will engage the inclined side-walls of the orifice restricting the upward axial movement of the screw 41. In this respect, the temple lug 23 will exert a downward pressure on the screw head 41 positively locking the screw head from undesirable axial movement after the temple adjusting screw 41 has been properly adjusted for the desired friction of the resilient means 20. The resilient means 20 may be of any of the types shown in the drawings, but as shown could be one having a cylindrical conformation about the orifices 33 as shown more clearly in Fig. 7.

The orifice 46 shown dotted is in the adjusting screw 41 at the end opposite the head 42. The orifice permits a tool to be inserted therein to bell-shape the orifice by compressing the lower extremities of the screw 41 against its adjacent side-wall which in this case is a female portion for receiving the threaded end of the screw 41. The pressure exerted by belling the lower extremity will increase the frictional engagement between the male and female threads so that the screw will be tightened in its complemental threads. The belling is such that sufficient tension with a screw driver will permit the screw to be removed after the lug 23 is swung out of place to permit access to the head of the screw.

It will therefore be seen that with the mechanism shown in Fig. 13, the extremities of the adjusting screw 41 will be individually gripped so that the lower gripping and the upper gripping frictional forces are additive, providing a greater resistance to rotation of the screw 15 once the screw has been properly adjusted. The material which the temple lugs are made out of is somewhat elastic and if the screw 41 is not moved to the position shown in Fig. 13 there will be a tendency to spread the free ends of the temple lugs 23 and 24 so that the bifurcated receptacle for the temple will have an inward pressure urging the screw head 41 into its complemental housing. The adjustments are extremely nice, and close tolerances are required to give the desired effect, that is by completely closing the intended contiguous surfaces of the temple lugs 23 and 24. While it is desirable to completely close the intended contiguous surface gap, this is not essential to the proper operation of the mechanism as set forth in Fig. 13 since a slight spacing between the members toward the free end would have no undesirable effect upon normal operation of the device as set forth. The increased pressure caused by the elasticity of the materials in the temple lugs 23 and 24 would be brought to bear on the head of the screw on one end and the threads of the screw on the opposing end. No increased strain would be brought to bear on the temple, hence no increased rotational friction of the temple. The adjustment screw 41 would fix the temple pressure of the resilient means, and any reasonable amount of pressure thereafter by the bifurcated temple lugs would only tend to increase the locking qualities restricting the axial movement of the adjusting screw 41.

Summarily, a split lens-rim temple support is channelled to provide a housing to restrict rotation of the U-shaped member. Further, the channelled portion is so shaped as to compress an enlarged closed portion of the U-shaped member and cause counter-pressure of the U-shaped member against the temple pivotal screw. Further, the cylindrical and/or cupped free end portions of the U-shaped member have means thereon to restrict rotational movement of the temple pivotal screw and provide a positive locking means therefor. Other of the objects should be clearly discernible and the natural result produced by the invention should immediately become apparent to those skilled in the art.

In commercial practice, the means employed may involve changes from the specific disclosure set forth herein and minor changes may readily suggest themselves. The right to make certain minor departures from the specifications and drawings is retained and equivalent parts may be used within the spirit of the invention as defined by the subjoined claims.

Having described my invention, I claim:

1. In an ophthalmic mounting having lens holding rims connected to opposing sides of a bridge, lenses in said lens holding rims, temple supporting means connected to each of the rims, temples connected to said temple supporting means, said temple supporting means each having a slot adapted to receive a temple, pivotal means for connecting the temple to the temple supporting means, unitary interchangeable resilient frictional means adjacent the temple pivotal means adapted to engage opposing sides of the temple and the inner surfaces of the slot where the temple is connected to the temple supporting means, said frictional means comprising an elongated piece of resilient material having an orifice in each end thereof to permit the temple pivotal means to be inserted therethrough and stop means embraced within said temple supporting means to prevent said resilient means from rotational movement about the axis of the temple pivotal means.

2. An ophthalmic mounting comprising divided lens-rims joined by a bridge member, a temple support comprising a lug secured to each of the divided ends of the lens-rims, said temple lugs having spaced aligned perforations and channels formed therein, said channel formations being curved inwardly at one end thereof, the other end of said channels forming a communicating port with a set of aligned perforations at the free ends of the temple lugs, a temple butt having a perforation therein adapted to have said perforation in axial alignment with said set of perforations, an adjusting screw insertable in said set of perforations and the perforation in the temple butt and being adapted to be threadedly connected to one of said temple lugs, a resilient U-shaped member having perforations therein adapted to be longitudinally inserted within said channel formation with the perforations therein substantially axially aligned with the temple adjusting screw, and distended portions formed on the free ends of the U-shaped member about the perforations therein, said distended portions having cuts therein communicating with the peripheral edge of the perforations constituting a locking means for engagement with the adjustment screw to restrict the rotation of the adjustment screw, the U-shaped member having one of its free ends disposed on either side of the temple butt to provide a resilient bearing between both sides of the temple butt and the adjusting screw connected to one of the temple lugs.

3. In an ophthalmic mounting, an endpiece comprising two separable members securely connected together by threaded means, each of said separable members having a slot adjacent one end thereof extending substantially along the line of the longitudinal axis of the member and being open on the inner face thereof and a reduced recess of less width than the slot communicating with said slot, said recesses forming a pocket when said separable members are in connected relation, a resilient member having an opening adjacent each of the opposed ends thereof, said resilient member being bent back on itself to form a U-shaped resilient spring with the closed end thereof being of a width less than the width of the portions having the openings therein, said resilient member being positioned in the slots with the closed end thereof fitting within the pocket formed by the reduced recesses and with the ends having the openings therein lying between the walls of the slots, a temple having a perforated end lying between and frictionally engaged by the portions of the resilient means having the openings therein with its perforated end aligned with said openings and pin-like means extending from at least one of said separable members internally of the aligned openings and perforation and providing pivotal means for the temple, said resilient member introducing a biasing action for frictionally limiting the pivotal movement of the temple on the pin-like means when the temple is assembled with the endpiece.

4. An ophthalmic mounting comprising a pair of divided lens rims joined by a supporting bridge member, lenses in said lens rims, each of the divided ends of the rims being provided with temple supporting lugs having contiguous surfaces which are stepped and which are provided with a reduced recess extending through the wall of the step and communicating with said stepped portions with said stepped portions being adapted to provide a temple receiving slot and with said recesses being adapted to form a pocket when said lugs are in connected relation with each other, a U-shaped resilient member having enlarged ends with openings therein, the closed end of the U being of a width less than the width of said ends, said resilient member being positioned between the walls of the slot with the closed end thereof positioned in the pocket formed by the end recesses, a temple having an opening in the end thereof positioned between the branches of the U-shaped resilient member internally of the slot and one of said temple supporting lugs having a protuberance extending through the aligned openings in the temple and branches of the resilient member with said resilient member introducing a biasing action for frictionally limiting the pivotal movement of the temple on the protuberance means.

5. In a device of the character described the combination of a pair of temple lugs having contiguous surfaces with recessed portions forming a slot adapted to receive a temple, a temple having a perforated butt portion lying within said slot, U-shaped resilient means having perforated portions adjacent the free ends thereof lying within said slot with said perforated portions overlying the opposed side surfaces of the temple butt between said side surfaces and the walls of the slot with the openings therein aligned with the opening in the temple butt, an adjusting screw extending through said aligned openings and threadedly connected with one of said temple lugs for pivotally supporting said temple and for simultaneously regulating the resilient friction of said resilient means on said temple butt and threaded means for connecting said temple lugs together which during the tightening of said threaded means and the movement of said contiguous surfaces toward each other will cause a bearing pressure to be exerted on the resilient means adjacent the closed end thereof tending to force said resilient means in a direction transversely of the axis of the adjusting screw whereby a portion of the resilient means having the openings therein will be forced into binding relation with the side wall of the adjusting screw and will tend to retain said screw against backing out and loosening during the use of the device.

6. In an ophthalmic mounting having lens holding rims connected to opposing sides of a bridge, temple supporting means connected to each of the rims, temples connected to said temple supporting means, said temple supporting means each having a slot adapted to receive a temple, pivotal means for connecting the temple to the temple supporting means, unitary interchangeable resilient frictional means adjacent the temple pivotal means adapted to engage opposing sides of the temple and the inner surfaces of the slot where the temple is connected to the temple supporting means, said frictional means comprising an elongated piece of resilient material having an orifice in each end thereof to permit the temple pivotal means to be inserted therethrough and stop means embraced within said temple supporting means to prevent said resilient means from rotational movement about the axis of the temple pivotal means.

7. An ophthalmic mounting comprising divided lens-rims joined by a bridge member, a temple lug secured to each of the divided ends of the lens-rims, said temple lugs having a first and a second set of perforations therein, a connecting screw extending within the first set of perforations and threadedly connected to one of the lugs for connecting said lugs together, an adjusting screw extending within said second set of perforations and threadedly connected to one of said lugs, a temple butt pivotally mounted on said adjusting screw, said lugs each having a channel formed therein communicating with the perforation for the adjusting screw and also having a curved surface communicating with the channel intermediate the first and second set of perforations, thereby forming a slot having converging curved surfaces at one end when the lugs are connected together, a resilient U-shaped member having perforations therein adapted to be longitudinally inserted in said slot with the curved closed end thereof engaging the converging curved surfaces of the lugs and with the perforations thereof positioned to receive the adjusting screw, said temple butt lying between the perforated portions of the resilient U-shaped member internally of the slot, the length of the slot and the position of the converging curved surfaces thereof with respect to the curved closed end of the U-shaped member and the distance between said end and the inner edges of the perforations being such that the closing together of the temple lugs by the connecting screw will cause the converging curved surfaces to compress the curved closed end of the U-shaped member and cause the inner edges of the perforations in said U-shaped member to exert a pressure on said adjusting screw substantially at right angles to the axis of said adjusting screw and thereby increase resistance of said screw to rotation.

8. An ophthalmic mounting comprising divided lens-rims joined by a bridge member, a temple support for each of said lens-rims comprising a temple lug secured to each of the divided ends of the lens-rim, a connecting screw for drawing said lugs together, said lugs having channels therein which, when the lugs are connected, communicate to form a slot, said channels having converging curved surfaces adjacent one end thereof, a temple pivotal screw for pivotally connecting a temple to said temple support, U-shaped resilient means longitudinally disposed in the slot with its bent end adapted to be engaged and compressed by the converging curved surfaces of the channels and having aligned perforations in portions thereof overlying and engaging opposing side surfaces of the temple through which the temple pivotal screw is extended, the portion of the slot formed by the converging surfaces being of a width less than the distance between the arms of the U-shaped means at the bent end thereof, gripping means on said resilient means about a portion of the periphery of at least one of said perforations adapted to engage the temple pivotal screw in a direction substantially lateral of the axis of said pivotal screw when the temple lugs are drawn together by the connecting screw and the converging curved surfaces of the channels engage the curved end of the resilient means and compress the same and hold said end against inward longitudinal movement while permitting outward longitudinal movement of the arms of the U-shaped means, whereby said gripping means will function to resist rotation of said adjusting screw when the lugs and temple are in assembled relation.

9. An ophthalmic mounting comprising lens-rims joined by a bridge member, a temple support on each of said rims having a slot to receive a temple, a temple having a perforated end connected to each of said temple supports with its perforated end lying in the slot, temple pivotal means extending through the perforated end of the temple for pivotally connecting the temple to said temple support, resilient means having a portion longitudinally disposed intermediate an inner wall of the slot and a side surface of the temple end pivotally connected to said support, said resilient means having a bent portion shaped to increase the length thereof when pressure is exerted on said bent portion, said resilient means having its bent end engaging a surface on to the temple support to hold said end against inward longitudinal movement and to simultaneously hold said resilient means against rotational movement and having an edge portion to engage the temple pivotal means when the resilient means is increased in length and means carried by the temple support for exerting a pressure on said bent portion of the resilient means to cause said resilient means to increase in length and to cause the edge portion engaging the temple pivotal means to exert a binding action on said temple pivotal means to hold said pivotal means against rotation during the pivotal movement of the temple.

10. In an ophthalmic mounting having lens holding rims connected to opposing sides of a bridge, temple supporting means connected to each of the rims, temples connected to said temple supporting means, said temple supporting means each having a slot adapted to receive a temple, pivotal means for pivotally connecting the temple to the temple supporting means, said pivotal means having a head portion adjustable toward the temple, unitary interchangeable resilient frictional means adjacent the temple pivotal means having a perforated cupped portion adapted to engage a side surface of the temple adjacent an inner surface of the slot where the temple is connected to the temple supporting means and with the temple pivotal means extending through the perforation in said cupped portion and the head portion thereof engaging said cupped portion, said resilient frictional means having a stop portion embraced within said temple supporting means to prevent said resilient means from rotating about the axis of the temple pivotal means with the inner end of said stop portion engaging the end wall of the slot to limit the longitudinal movement of said end in the direction of said end wall and with an edge of the perforation in the cupped portion engaging the pivotal means whereby pressure exerted on the cupped portion by the head of the temple pivotal means will cause increased friction between the said portion and the adjacent side surface of the temple and will simultaneously cause the edge of the perforation in the cupped portion engaging the pivotal means to exert a binding pressure on said pivotal means in a direction substantially at right angles to the longitudinal axis of said pivotal means to increase resistance thereof to rotation.

EDWARD M. SPLAINE.